(12) United States Patent
Inoue et al.

(10) Patent No.: US 8,147,145 B2
(45) Date of Patent: Apr. 3, 2012

(54) JOURNAL BEARING DEVICE

(75) Inventors: Tomoaki Inoue, Mito (JP); Makoto Hemmi, Hitachinaka (JP); Kenta Suzuki, Hitachinaka (JP); Hajime Toriya, Hitachi (JP); Katsuhiro Murakami, Kitaibaraki (JP); Koji Kawai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 474 days.

(21) Appl. No.: 12/370,035

(22) Filed: Feb. 12, 2009

(65) Prior Publication Data
US 2009/0238506 A1 Sep. 24, 2009

(30) Foreign Application Priority Data

Mar. 19, 2008 (JP) .................................. 2008-070556

(51) Int. Cl.
*F16C 37/00* (2006.01)
(52) U.S. Cl. ........................................ 384/316; 384/313
(58) Field of Classification Search .................. 384/313, 384/316, 317, 321, 286, 291
See application file for complete search history.

(56) References Cited

U.S. PATENT DOCUMENTS
3,743,367 A 7/1973 Raimondi
6,966,700 B2 * 11/2005 Weissbacher ................. 384/313

FOREIGN PATENT DOCUMENTS

| DE | 23 49 190 A1 | 3/1975 |
| GB | 781085 A | 8/1957 |
| JP | 08-093769 | 4/1996 |
| JP | 10-213130 | 8/1998 |
| JP | 2002-122143 A | 4/2002 |
| JP | 2004-092878 | 3/2004 |
| JP | 2006-112499 A | 4/2006 |
| JP | 2006-138353 | 6/2006 |

* cited by examiner

*Primary Examiner* — Thomas R Hannon
(74) *Attorney, Agent, or Firm* — Mattingly & Malur, PC

(57) ABSTRACT

An increase in the temperature of a sliding bearing can be suppressed, and it is possible to reduce the temperature of the bearing and prevent burning and damage. The bearing is divided in two and composed of a liner and a base metal. The liner is disposed on an inner circumferential side of the bearing, and the base metal is disposed on an outer circumferential side of the bearing. A lower liner of the bearing liner, which is located on a load-receiving side, has a cooling groove formed in an outer circumferential surface thereof and extending along a circumferential direction thereof. A lubricant is cooled in the cooling groove and supplied to reduce the temperature of a shaft-sliding surface of the bearing. The lubricant is supplied to the bearing, increases in temperature due to the cooling and has low viscosity.

11 Claims, 17 Drawing Sheets

JOURNAL BEARING DEVICE

BACKGROUND OF THE INVENTION

1. Field of the Invention

The present invention relates to a structure of a bearing that holds a rotary body. The invention more particularly relates to a journal bearing that prevents seizure and holds a rotary body with a high load, and to a lubricant supply structure of the journal bearing, which is designed to supply a cooled lubricant to a back surface of the bearing and reduce the temperature of the bearing.

2. Description of the Related Art

An elliptical bearing has been generally used to prevent a self-excited oscillation as a bearing holding a large rotary body (e.g., for a thermal power plant) in which a natural frequency of a multi-span shaft is relatively low.

Since a primary critical speed of a bearing for a steam turbine having a large capacity, like a conventional steam turbine shown in FIG. 17, is low, an oil groove is provided at a central portion of a lower bearing 2a in the direction of the width of the lower bearing 2a and extends along a circumferential direction of the lower bearing 2a to reduce load capacity of the bearing, increase an eccentricity ratio, and ensure stability. Because a rim speed of such a large-scaled bearing is approximately 100 m/s, flow of a lubricant is turbulent, and apparent viscosity of the lubricant increases. Thus the temperature of the bearing tends to increase. Therefore, a cooling groove is provided in an upper half bearing 2b. The cooling groove is designed to cool the rotary shaft, and it is therefore difficult to cool the highest-temperature portion of the bearing.

JP-A-H08-93769 discloses a technique for cooling a bearing. As disclosed in JP-A-H08-93769, a circumferential oil groove and a dam are provided in a shaft-sliding surface of the bearing, and pressure of a lubricant agent present in the dam is adjusted, to prevent the bearing from burning and a rotary shaft from unstably shaking.

JP-A-H10-213130 and JP-A-2006-138353 disclose that a groove is provided in a back metal, and a lubricant is supplied to the groove to cool the back metal. This prevents a bearing from burning. In addition, JP-A-2004-92878 discloses that a hydrostatic bearing has a cooling medium supply pocket formed in an outer circumferential surface thereof. A cooling medium or a lubricant is supplied to cool the bearing.

SUMMARY OF THE INVENTION

As disclosed in JP-A-H08-93769, adjusting the pressure of the lubricant in the dam can prevent a seizure. But this method cannot be applied when the self-weight of a rotor is large and the average surface pressure ((load applied to the bearing)/(diameter of the bearing)×(the width of the bearing)) of the bearing is high. In such a case, the thickness of an oil film is small, and the temperature of the bearing is high even when the pressure of the lubricant in the dam is adjusted. It is, therefore, an object of the present invention to provide a bearing capable of improving performance for preventing burning by supplying a cooled lubricant to the bearing even under a high load.

As disclosed in JP-A-H10-213130 and JP-A-2006-138353, the groove is provided in a part of the back metal, and a lubricant for cooling is supplied to the groove. In these methods, only the part of the back metal, in which the groove is provided, is cooled.

As disclosed in JP-A-2004-92878, a supply path is provided in an outer circumferential surface of the bearing to cool the bearing and adapted to cool a cooling medium or a lubricant. In this method, a coolant is supplied from the upstream side with respect to a rotation of a rotary shaft. The temperature of the bearing is higher toward the downstream side and lower toward the upstream side. Therefore, the difference between the temperature of the coolant and the temperature of the bearing is small, and a cooling capacity is low. In addition, since the lubricant and the coolant are supplied from different paths, a large amount of the lubricant is required even when the lubricant is used as the coolant. This results in an increase in the size of an auxiliary device.

An object of the present invention is to provide a journal bearing device capable of cooling a bearing and reducing damage of the bearing by supplying a cooled lubricant to an outer circumference of the bearing located on a load-receiving side to cool the bearing and supplying the lubricant to a shaft-sliding surface of the bearing.

To accomplish the aforementioned object, the journal bearing device has a bearing base metal and a bearing liner. The bearing base metal and the bearing liner constitute a bearing. The bearing liner is provided on an inner circumferential side of the bearing base metal. The bearing liner is divided into an upper bearing liner and a lower bearing liner. The lower bearing liner has a cooling groove formed in an outer circumferential surface thereof. The cooling groove extends along a circumferential direction of the lower bearing liner. A lubricant is supplied to the cooling groove such that the lubricant flows in the opposite direction to a rotational direction of a rotor. The lubricant passes through the cooling groove and is supplied to a bearing load-receiving surface of the bearing. The journal bearing device is realized with a configuration described in each claim of this application.

The journal bearing device according to the present invention is capable of efficiently cooling an area in which the temperature of a portion of the bearing is the highest of all portions of the bearing, preventing the bearing from burning and being damaged, allowing high pressure to be applied to the surface of the bearing, and reducing damage of the bearing and the amount of a lubricant to be supplied, since the lubricant is supplied to the outer circumferential surface of the bearing liner such that the lubricant flows in the opposite direction to the rotational direction of the rotor.

DESCRIPTION OF THE PREFERRED EMBODIMENTS

A first embodiment of the present invention is described below with reference to the accompanying drawings.

First Embodiment

Figure 1:
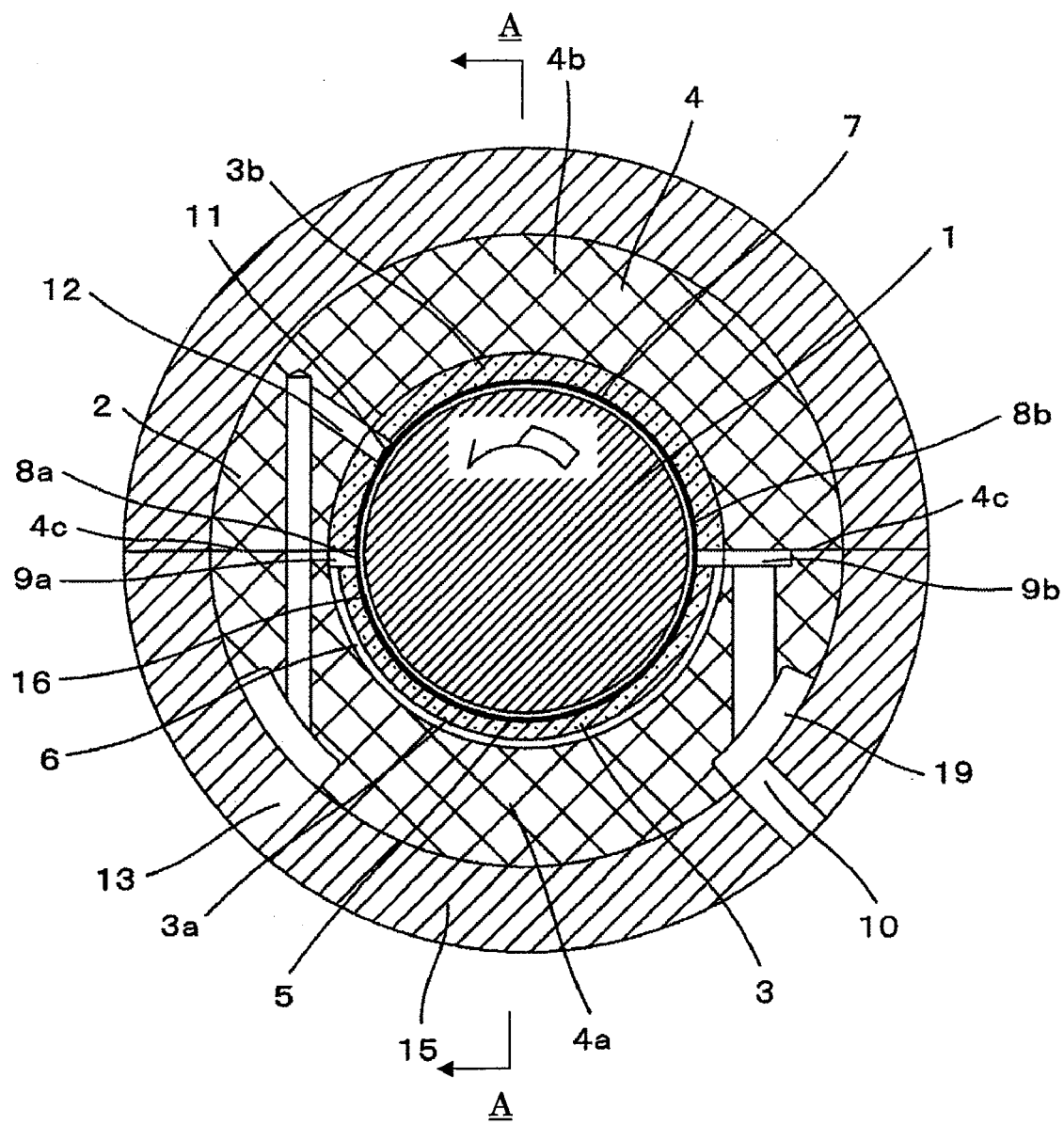
FIG. 1 is a vertical cross-sectional view of a bearing according to a first embodiment of the present invention.

FIG. 1 is a vertical cross-sectional view of a bearing according to the first embodiment of the present invention.

Figure 2:
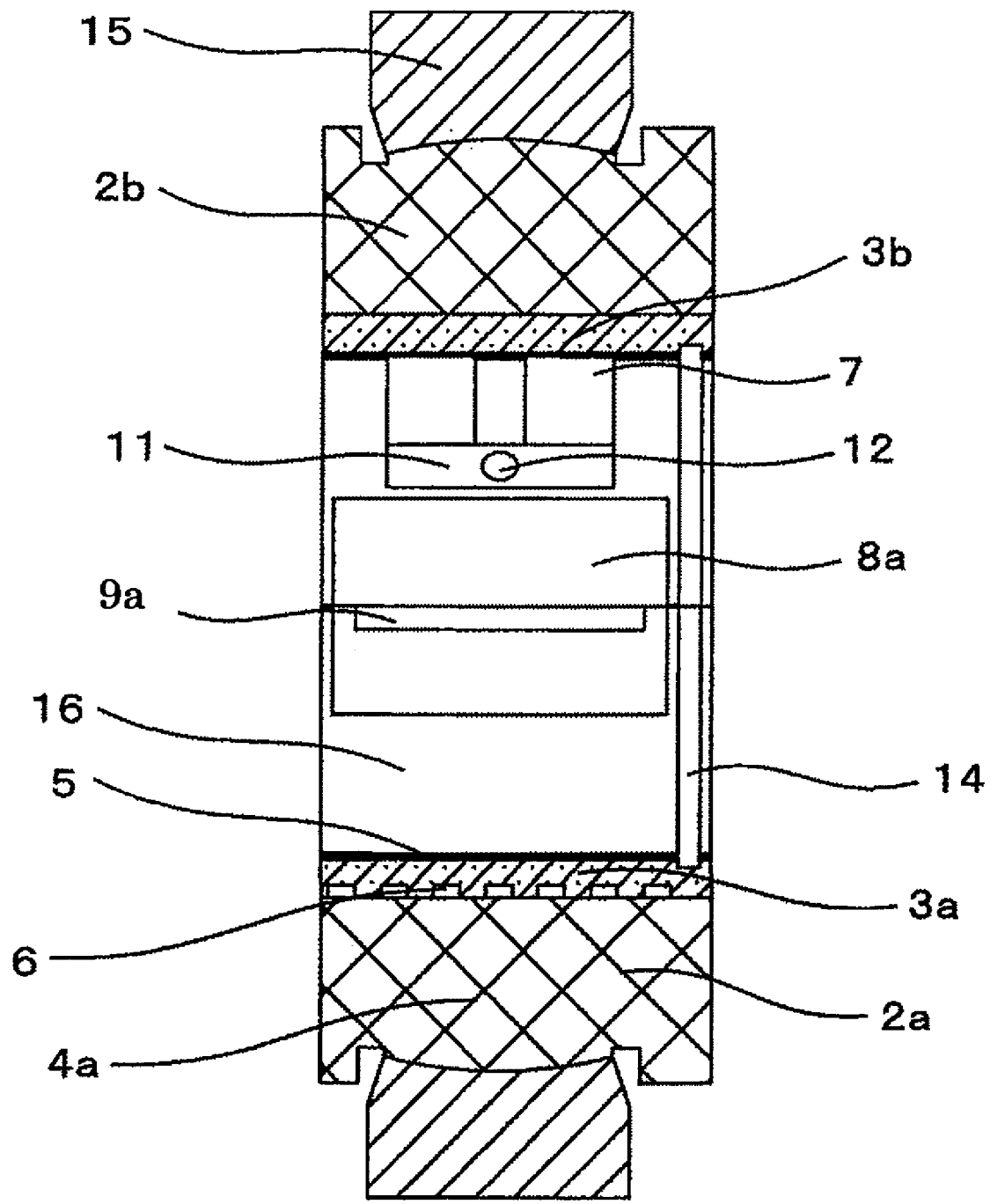
FIG. 2 is a vertical cross-sectional view of a part of the bearing shown in FIG. 1.

FIG. 2 is a cross-sectional view taken along the line A-A of FIG. 1.

With cross-reference to FIGS. 1 and 2, reference numeral 1 denotes a rotary shaft, and reference numeral 2 denotes the bearing. The bearing 2 that holds the rotary shaft 1 is divided vertically into two: a lower bearing part 2a and an upper bearing part 2b. The bearing 2 is composed of a bearing liner 3 and a bearing base metal 4. As shown in FIG. 1, the bearing liner 3 is located on the inner circumferential side of the bearing 2 while the bearing base metal 4 is located on the outer circumferential side of the bearing 2. The outer circumferential surface of the bearing base metal 4 is spherical in shape as shown in FIG. 2, and a spherical seat 15 is provided around that surface. The inner circumferential surface of the bearing liner 3 is lined with a bearing metal 5. The bearing liner 3 is also divided into two: a lower bearing liner 3a (load-receiving side) and an upper bearing liner 3b (non-load-receiving side). As shown in FIG. 2, multiple cooling grooves 6 are provided around the outer circumferential surface of the lower bearing liner 3a. Cooling grooves 7 are also provided on the inner circumferential surface of the upper bearing liner 3b via the bearing metal 5.

The bearing base metal 4 is also divided into two, base metals 4a and 4b, by a border 4c, and lubricant supply pockets 8a and 8b are provided in the base metals 4a and 4b, near the border. The lubricant supply pocket 8a communicates with the cooling grooves 6 and the cooling grooves 7. The lubricant supply pocket 8a also communicates with oil pockets 9a and 9b provided at the boundary of the divided bearings 2 and with a lubricant pocket 19 provided in the base metal 4a. Furthermore, the lubricant supply pocket 8a communicates, via the lubricant pocket 19, with an oil supply hole 10 provided in the spherical seat 15 located on the outer circumferential surface of the bearing base metal 4. The flow of the lubricant supplied from the oil supply hole 10 diverges from the oil pocket 9b. One part is directed into the cooling grooves 7; the other is directed into the cooling grooves 6 to cool a shaft-sliding surface 16 of the bearing metal 5.

The cooling grooves 7 on the upper side of the bearing 2 are provided on the inner circumferential surface of the bearing 2 via the upper bearing liner 3b and the bearing metal 5 and extend in the rotational direction of the rotary shaft 1. The terminal portions of the cooling grooves 7 communicate with an oil pocket 11 located on the upper side of the bearing 2. The oil pocket 11 has an oil drain hole 12. The oil pocket 11 communicates, through this oil drain hole 12, with a lubricant drain hole 13 provided in the lower bearing liner 3a and the lower base metal 4a. For the purpose of preventing lubricant leakage, a lubricant drain groove 14 (shown in FIG. 2) is provided on the right side of the shaft-sliding surface 16, that is, on the open end side (the right side of FIG. 2) of a bearing housing (not shown) having the bearing therein. The lubricant drain groove 14 is adapted to discharge extra lubricant to the lower side of the bearing.

Next, an effect of the present embodiment is described below with reference to FIG. 3.

Figure 3:
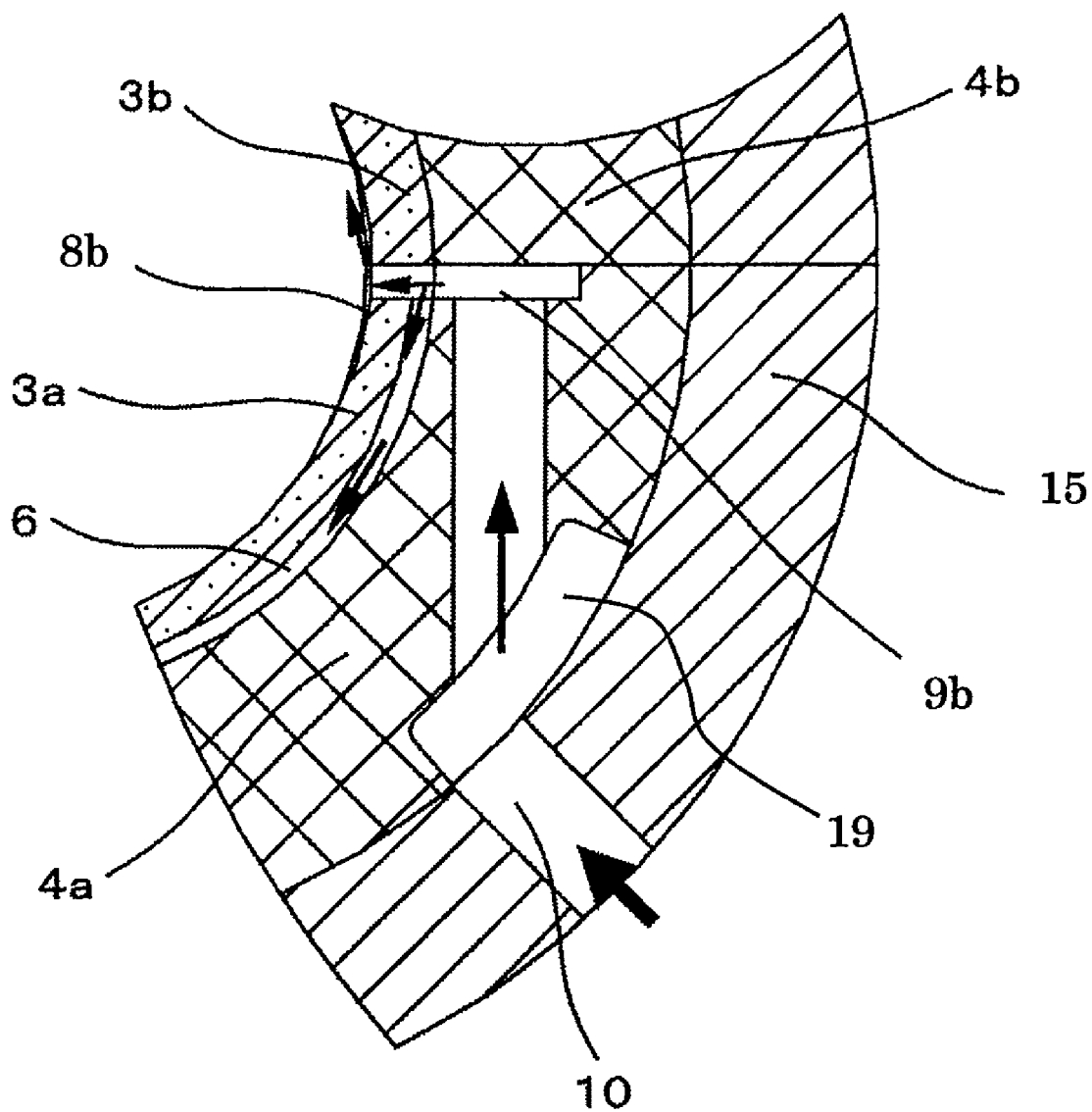
FIG. 3 is a diagram showing a part of the bearing and explaining the state in which a lubricant is supplied.

FIG. 3 is a partially enlarged cross-sectional view of the bearing according to the present embodiment and explains the flow of a lubricant.

In FIG. 3, a cooled lubricant (not shown) is supplied from the oil supply hole 10 through the lubricant pocket 19 provided in the base metal 4a into the oil pocket 9b. One lubricant flow from the oil pocket 9b is directed into and diverged by the cooling grooves 7 to cool the rotary shaft 1. The diverged lubricant flows running through the cooling grooves 7 are introduced into the oil pocket 11, where they are converged. The converged lubricant flow is then discharged from the oil drain hole 12 through the base metal 4 and the lubricant drain hole 13 to the outside of the bearing 2.

Thus, the temperature-increased lubricant that has finished cooling the rotary shaft 1 does not flow onto the shaft-sliding surface 16 of the lower bearing 2a. On the other hand, the other lubricant flow from the oil pocket 9b is directed into the cooling grooves 6 to cool the shaft-sliding surface 16 from its back side (outer circumferential side) and then supplied through the oil pocket 9a (located on the opposite side of the oil pocket 9b) onto the shaft-sliding surface 16.

Figure 4:
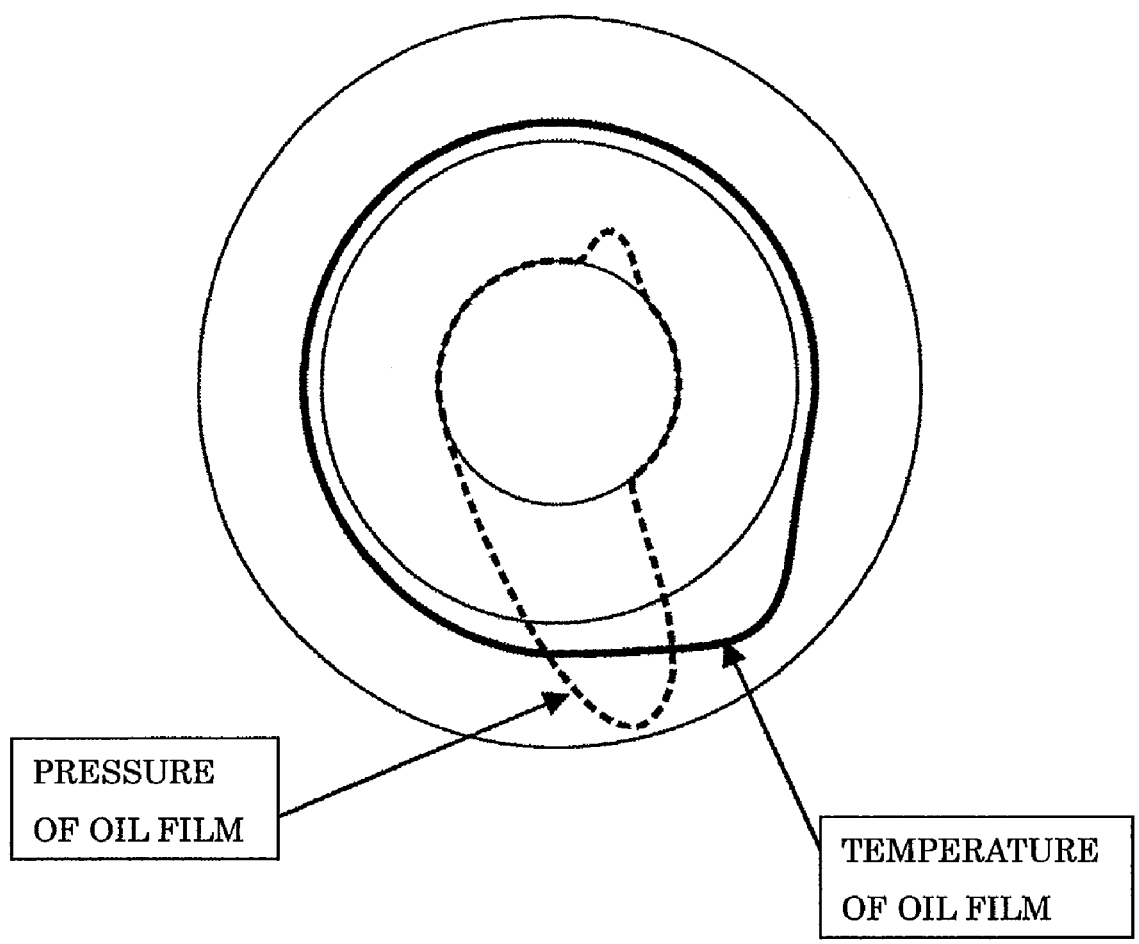
FIG. 4 is a diagram showing a distribution of pressure of an oil film and a distribution of the temperature of the oil film.

Described next with reference to FIG. 4 is the relationship between the distribution of the pressure exerted on an oil film (lubricant) and the temperature distribution of the film inside the journal bearing.

FIG. 4 is a diagram showing the pressure and temperature distributions of the oil film with the use of a cross-section of the journal bearing.

In FIG. 4, the broken line indicates the pressure distribution, and the bold line the temperature distribution. The oil film pressure reaches a peak just before the thickness of the film becomes minimal; the oil film temperature reaches a peak when the thickness of the film becomes minimal and decreases gradually thereafter. The film-minimum position inside the bearing is located 30 to 40 degrees away from the line connecting the rotational axis of the rotary shaft 1 and the lowest point of the bearing in the rotational direction of the rotary shaft 1 (the rotational direction being the counterclockwise direction of FIG. 4). The bearing temperature is the highest at that position, and so is the oil film temperature. Because the journal bearing of the first embodiment is designed to supply cooled lubricant also in the reverse direction of the rotational direction of the rotary shaft 1, the bearing can be cooled with the temperature difference between the bearing and the cooled lubricant being maximal. This makes it possible to improve the cooling effect and efficiently reduce the highest temperature the bearing undergoes.

The features of the journal bearing according to the present embodiment can be roughly summarized as follows. The journal bearing is composed of the vertically divided upper and lower bearing parts and used to support the rotor of a rotary machine. The journal bearing structurally includes the bearing base metal and the bearing liner. The bearing liner is made of a material different from that of the bearing base metal. The bearing liner and the bearing base metal are integrated with each other by means of a fastening member. At least one circumferential oil groove is provided in an outer circumferential portion of the lower bearing liner, the load-receiving-side bearing liner. The journal bearing is provided with means for supplying a lubricant to the circumferential oil groove from the downstream side in the rotational direction of the rotor. The lubricant that has passed through the circumferential oil groove is then supplied onto the bearing load-receiving surface (rotor-sliding surface).

Second Embodiment

Figure 5:
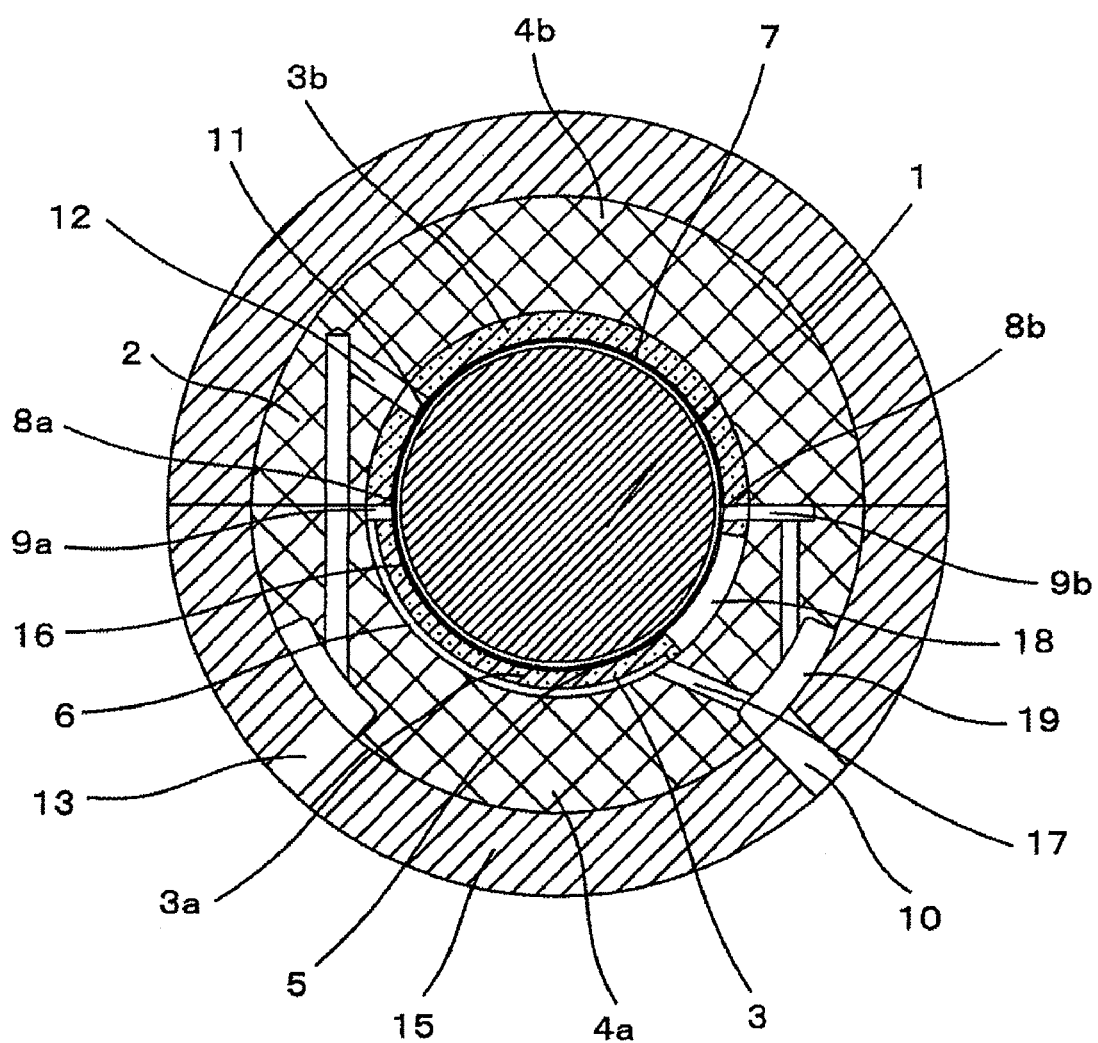
FIG. 5 is a vertical cross-sectional view of a bearing according to a second embodiment of the present invention.

FIG. 5 is a vertical cross-sectional view of a bearing according to a second embodiment of the present invention.

In FIG. 5, reference numeral 1 denotes a rotary shaft, and reference numeral 2 denotes the bearing. The bearing 2 holding the rotary shaft 1 is vertically divided into two: the upper bearing 2b and lower bearing 2a. The bearing 2 is composed of the bearing liner 3 and the bearing base metal 4. The bearing base metal 4 is divided into the two bearing base metals 4a and 4b as also described later. The bearing liner 3 is located on the inner circumferential side of the bearing 2 while the bearing base metal 4 is located on the outer circumferential side of the bearing 2. The outer circumferential surface of the bearing base metal 4 is spherical in shape, and the spherical seat 15 is provided around that surface. The inner circumferential surface of the bearing liner 3 is lined with the bearing metal 5. The bearing liner 3 is also divided into two: the lower bearing liner 3a (load-receiving side) and the upper bearing liner 3b (non-load-receiving side). The multiple cooling grooves 6 are provided around the outer circumferential surface of the lower bearing liner 3a. The cooling grooves 7 are also provided on the inner circumferential side of the upper bearing liner 3b via the bearing metal 5.

The bearing base metal 4 is divided into the two bearing base metals 4a and 4b. The lubricant supply pockets 8a and 8b are provided in the base metals 4a and 4b, in the vicinity of the boundary between the base metals 4a and 4b. The lubricant supply pocket 8a communicates with the cooling grooves 7; in addition, it communicates, via the oil pockets 9a and 9b provided at the boundary of the divided bearings 2, with the lubricant pocket 19 provided in the base metal 4a and with the oil supply hole 10 provided in the spherical seat 15 located on the outer circumferential side of the bearing base metal 4. The oil supply hole 10 has an oil supply hole 17 that communicates with the cooling grooves 6 provided in the lower bearing liner 3a.

The cooling grooves 7 are located on the inner circumferential surface of the bearing 2 and extend in the rotational direction of the rotary shaft (rotor) 1. The terminal portions of the cooling grooves 7 communicate with the oil pocket 11 located on the upper side of the bearing 2. The oil pocket 11 has the oil drain hole 12. The oil pocket 11 communicates, through the oil drain hole 12, with the lubricant drain hole 13 provided in the bearing liner 3a and the base metal 4a.

The shaft sliding surface 16 and the lower bearing liner 3a are partially removed to form a clearance 18. They are removed from where no pressure is exerted on the oil film (lubricant). As shown in FIG. 5, the clearance 18 extends from the line located 30 to 40 degrees counterclockwise away from the line connecting the rotational axis of the rotary shaft 1 and the lowest point of the bearing 2 up to the boundary between the divided bearing parts 2a and 2b.

In the present embodiment, a lubricant is supplied from the oil supply hole 10. The lubricant from the oil supply hole 10 flows into the lubricant pocket 19 and diverges therefrom into the oil supply hole 17 and the oil pocket 9b. The lubricant into the oil supply hole 17 flows therefrom into the cooling grooves 6 to cool the shaft-sliding surface 16 from its back side (outer circumferential side) and is then supplied through the oil pocket 9a onto the shaft-sliding surface 16. The lubricant into the oil pocket 9b, on the other hand, is directed into and diverged by the cooling grooves 7 to cool the rotary shaft 1. The diverged lubricant flows running through the cooling grooves 7 are introduced into the oil pocket 11, where they are converged. The converged lubricant flow is then discharged from the oil drain hole 12 through the base metal 4 and the lubricant drain hole 13 to the outside of the bearing 2. Thus, the temperature-increased lubricant that has finished cooling the rotary shaft 1 does not flow onto the shaft-sliding surface 16 of the lower bearing 2a.

Because the shaft sliding surface 16 and the lower bearing liner 3a are removed where no pressure is exerted on the lubricant film, the present embodiment can reduce the damage to that portion, i.e., the clearance 18 due to lack of lubricant. The present embodiment is also most effective in cooling the journal bearing because the lubricant first cools the maximum temperature portion of the bearing.

The features of the journal bearing according to the second embodiment can be roughly summarized as follows. The journal bearing is composed of the vertically divided upper and lower bearing parts and used to support the rotor of a rotary machine. The journal bearing structurally includes the bearing base metal and the bearing liner. The bearing liner is made of a material different from that of the bearing base metal. The bearing liner and the bearing base metal are integrated with each other by means of a fastening member. The lower bearing liner on the load-receiving side has the shaft-sliding surface that extends counterclockwise from the left boundary in FIG. 5 between the upper and lower bearing parts up to the area in which no pressure is exerted on the lubricant film. At least one circumferential oil groove is provided in an outer circumferential portion of the lower bearing liner, the load-receiving-side bearing liner. The journal bearing is provided with means for supplying a lubricant to the circumferential oil groove from the downstream side in the rotational direction of the rotor. The lubricant that has passed through the circumferential oil groove is then supplied onto the bearing load-receiving surface (rotor-sliding surface).

Third Embodiment

Figure 6:
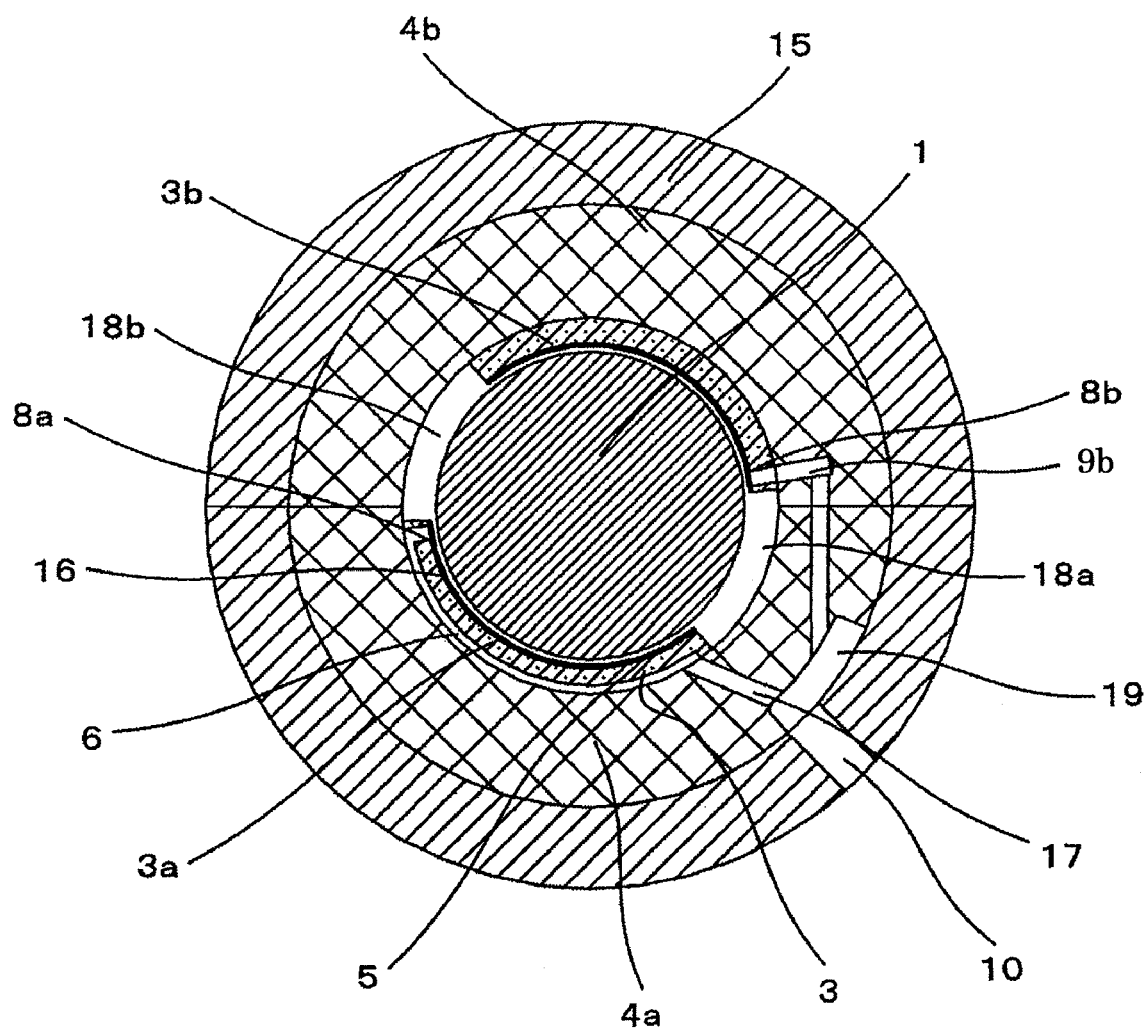
FIG. 6 is a vertical cross-sectional view of a bearing according to a third embodiment of the present invention.

FIG. 6 is a vertical cross-sectional view of a bearing according to a third embodiment of the present invention.

Figure 7:
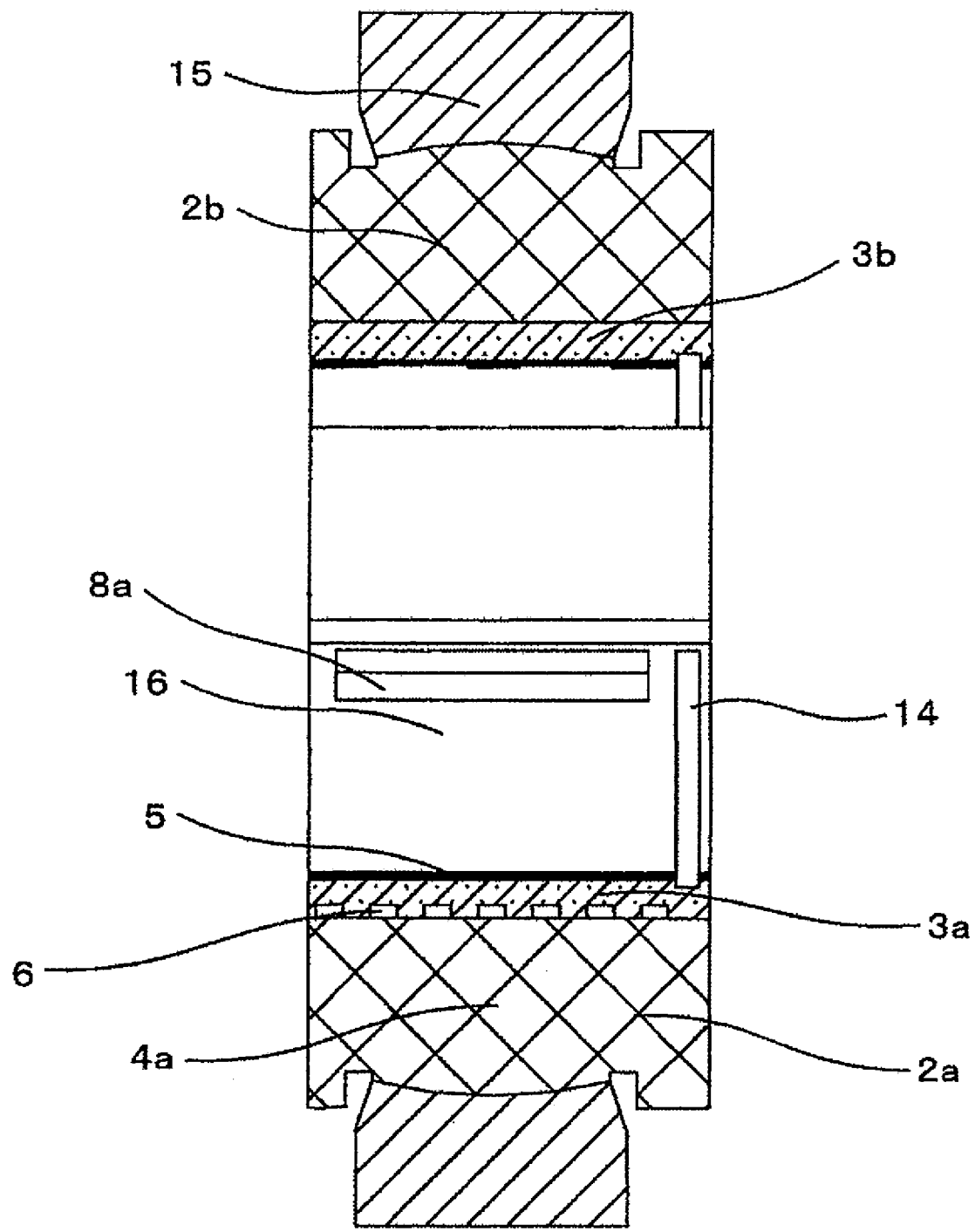
FIG. 7 is a vertical cross-sectional view of a part of the bearing shown in FIG. 6.

FIG. 7 is a vertical cross-sectional view of a part of the bearing shown in FIG. 6.

With cross-reference to FIGS. 6 and 7, reference numeral 1 denotes a rotary shaft, and reference numeral 2 denotes the bearing. The bearing 2 holding the rotary shaft 1 is vertically divided into two: the upper bearing 2b and lower bearing 2a. The bearing 2 is composed of the bearing liner 3 and the bearing base metal 4. The bearing base metal 4 is divided into the two bearing base metals 4a and 4b as also described later. The bearing liner 3 is located on the inner circumferential side of the bearing 2 while the bearing base metal 4 is located on the outer circumferential side of the bearing 2. The outer circumferential surface of the bearing base metal 4 is spherical in shape, and the spherical seat 15 is provided around that surface. The inner circumferential surface of the bearing liner 3 is lined with the bearing metal 5. The bearing liner 3 is also divided into two: the lower bearing liner 3a (load-receiving side) and the upper bearing liner 3b (non-load-receiving side). The multiple cooling grooves 6 are provided around the outer circumferential surface of the lower bearing liner 3a.

Each of the bearing liners 3a and 3b is a partial bearing extending approximately 100 degrees around the rotary shaft 1. The bearing liners 3a and 3b have the oil supply pockets 8a and 8b at inlets thereof, respectively. The oil supply pocket 8a communicates with the cooling grooves 6. The cooling grooves 6 communicate with the lubricant pocket 19 provided in the bearing base metal 4a. On the other hand, the oil supply pocket 8b communicates with the oil pocket 9b provided in the bearing base metal 4b. The oil supply pocket 8b and the oil pocket 9b merge at the oil pocket 19. The oil pocket 19 communicates with the supply oil hole 10.

The present embodiment is especially effective for an elliptical bearing, in which kinetic pressure is also exerted on its upper bearing portion, non-load-receiving bearing; it is also applicable to a circular bearing.

As described above, in the present embodiment, a lubricant is supplied from the oil supply hole 10 into the lubricant pocket 19, from which the lubricant diverges into the oil supply hole 17 and the oil pocket 9b. The lubricant into the oil supply hole 17 flows therefrom into the cooling grooves 6 to cool the shaft-sliding surface 16 from its back side (outer circumferential side) and is then supplied through the oil supply pocket 8a onto the shaft-sliding surface 16. The lubricant into the oil pocket 9b, on the other hand, lubricates the shaft-sliding surface of the upper bearing 2b and is then discharged to the outside of the bearing from a cut out portion 18b provided on both sides of the bearing and downstream in the lubricant flowing direction. Thus, the temperature-increased lubricant that has lubricated the shaft-sliding surface of the upper bearing 2b does not flow into the shaft-sliding surface of the lower bearing 2a.

The features of the journal bearing according to the third embodiment can be roughly summarized as follows. The journal bearing is composed of the vertically divided upper and lower bearing parts and used to support the rotor of a rotary machine. The journal bearing structurally includes the bearing base metal and the bearing liner. The bearing liner is made of a material different from that of the bearing base metal. The bearing liner and the bearing base metal are integrated with each other by means of a fastening member. The lower bearing liner on the load-receiving side and the upper bearing liner on the non-load-receiving side each have a shaft-sliding surface that extends to cover the area in which pressure is exerted on the lubricant film. At least one circumferential oil groove is provided in an outer circumferential portion of the lower bearing liner, the load-receiving-side bearing liner. The journal bearing is provided with means for supplying a lubricant to the circumferential oil groove from the downstream side in the rotational direction of the rotor. The lubricant that has passed through the circumferential oil groove is then supplied onto the bearing load-receiving surface (rotor-sliding surface).

Fourth Embodiment

A bearing according to a fourth embodiment of the present invention is described below with reference to FIGS. 8 to 13B.

Figure 8:
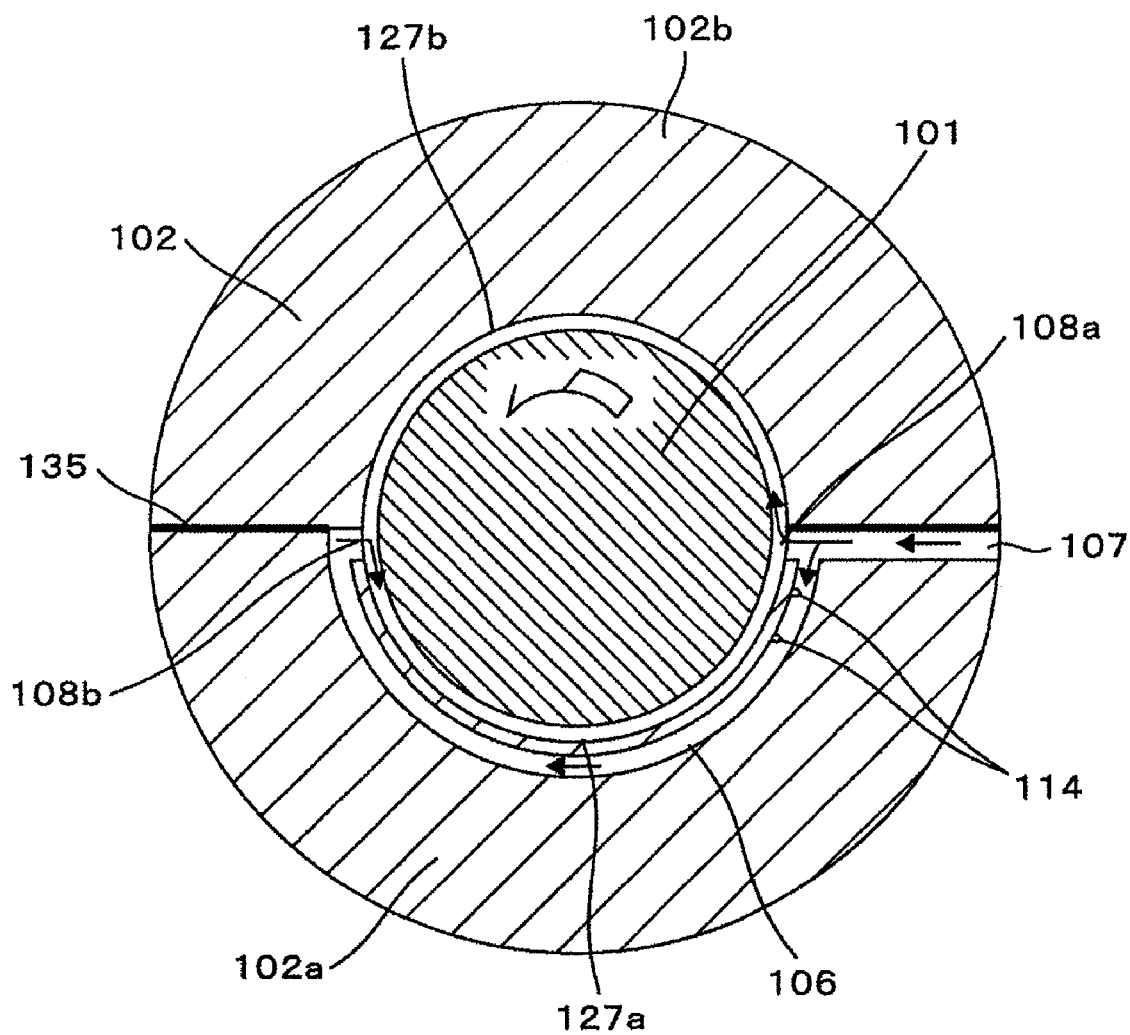
FIG. 8 is a vertical cross-sectional view of a bearing according to a fourth embodiment of the present invention.

FIG. 8 is a vertical cross-sectional view of a bearing of the journal bearing device according to the present embodiment.

Figure 9:
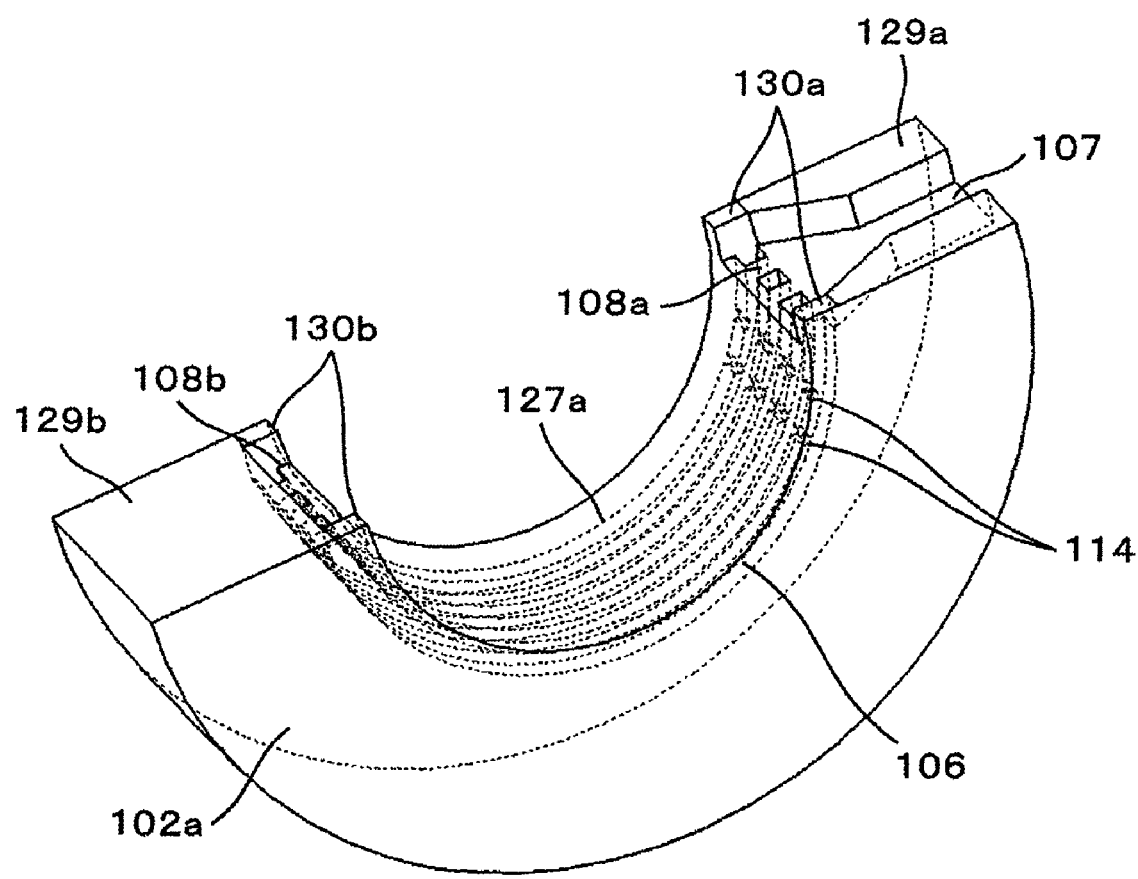
FIG. 9 is a perspective view of a lower bearing of the bearing shown in FIG. 8.
Figure 10:
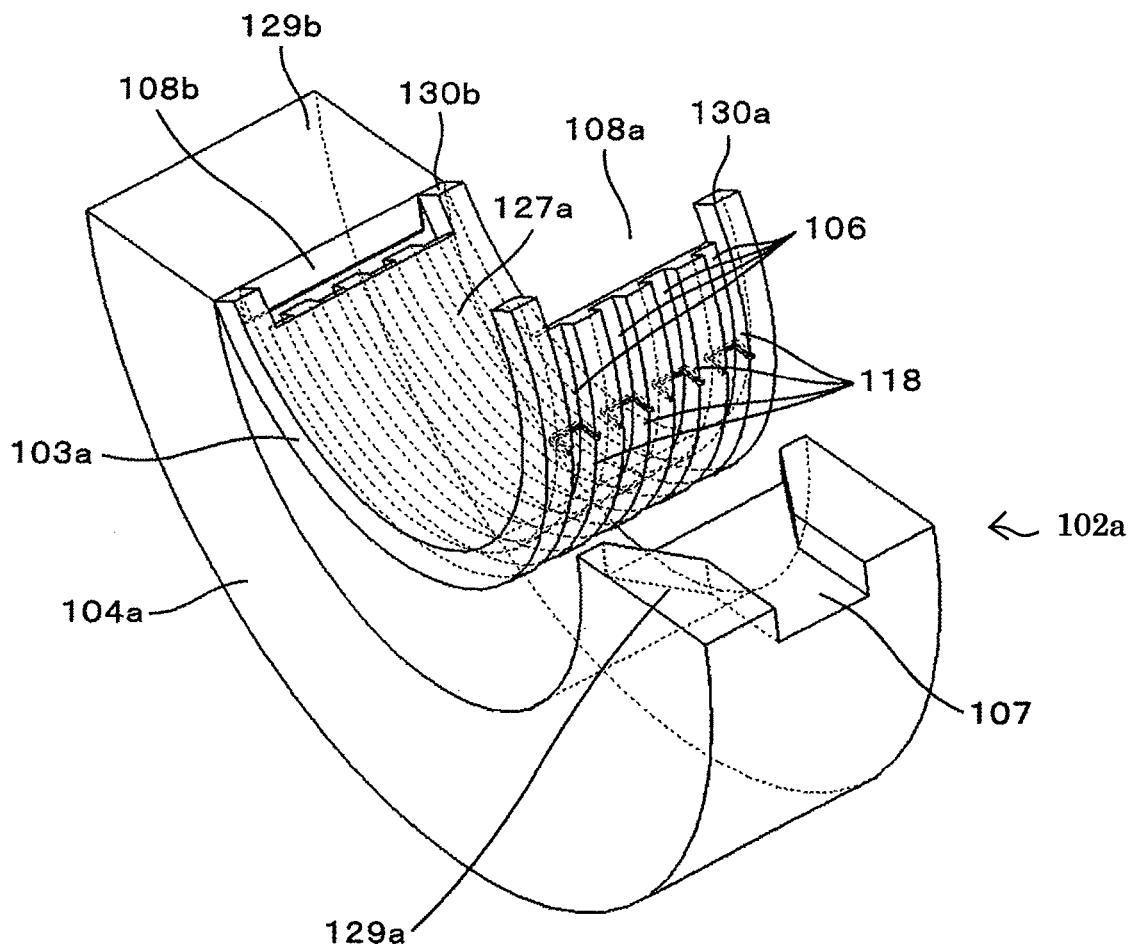
FIG. 10 is a perspective view of the lower bearing and shows an example of installment of a structure designed to disturb flow of a lubricant.

FIGS. 9 and 10 are perspective views of a lower bearing 102a.

A bearing 102 that supports a rotary shaft 101 structurally includes a bearing base metal and a bearing liner disposed on the inner circumferential side of the bearing base metal, both not shown in FIGS. 8 and 9. The inner circumferential surface of the bearing liner is lined with a bearing metal (not shown). The bearing metal constitutes a shaft-sliding surface 127a and 127b that faces the rotary shaft 101.

Note that the outer circumferential surface of the bearing base metal is provided with a spherical seat (not shown).

As shown in FIG. 8, the bearing 102 is vertically divided into two bearings, an upper bearing 102b and a lower bearing 102a, by a border 135. That is, the bearing base metal is also vertically divided into two bearing base metals, an upper base metal and a lower base metal, by the border 135; in addition, the bearing liner is also vertically divided into two bearing liners, an upper bearing liner and a lower bearing liner.

As shown in FIG. 10, the lower bearing 102a is composed of the bearing base metal 104a and the bearing liner 103a located on the inner circumferential side of the bearing base metal 104a. At least one circumferential cooling groove 106 is provided on the outer circumferential surface of the bearing liner 103a.

The lower bearing base metal 104a has a contact surface 129a that comes into contact with the upper bearing base metal. The contact surface 129a is provided with an oil supply path 107. The oil supply path 107 communicates with an oil supply hole (not shown) provided in the spherical seat and with the inner circumferential side of the bearing base metal 104a. The oil supply hole is connected with an oil supply pump (not shown) provided outside the bearing 102. A lubricant supplied from the oil supply pump thus flows through the oil supply hole and the oil supply path 107 into the inner circumferential side of the bearing base metal 104a.

It should be noted that the oil supply path 107 is formed by coupling the contact surface 129a of the bearing base metal 104a on which the groove (the oil supply path 107) is provided to a contact surface (not shown) of the bearing upper base metal that faces the bearing base metal 104a.

The lower bearing liner 103a has also contact surfaces 130a and 130b. The contact surfaces 130a and 130b are joined to a contact surface of the upper bearing liner. The contact surface 130a has a lubricant introduction path 108a thereon; the contact surface 130b has a lubricant introduction path 108b thereon. The lubricant introduction paths 108a and 108b leads to a shaft-sliding surface 127a provided on the inner circumferential surface of the lower bearing liner 103a.

It should be noted that the lubricant introduction paths 108a and 108b are formed by joining the contact surfaces 130a and 130b onto the contact surface of the upper bearing liner, which faces the contact surfaces 130a and 130b.

The lubricant introduction path 108b communicates with cooling grooves 106. The cooling grooves 106 communicate with the lubricant introduction path 108a. The lubricant introduction path 108a communicates also with the oil supply path 107.

The lubricant supplied from the outside of the bearing 102 by the oil supply pump thus flows through the oil supply hole and oil supply path 107 into the lubricant introduction path 108a. A part of the lubricant flows into the cooling grooves 106 that communicate with the lubricant introduction path 108a to cool the shaft-sliding surface 127a of the lower bearing 102a from its back side (the outer circumferential side).

The part of the lubricant then flows through the lubricant introduction path 108b onto the shaft-sliding surface 127a.

It should be noted that the oil supply path 107 is provided on the contact surface 129a, not the contact surface 129b, so that the lubricant flows through the cooling grooves 106 in the opposite direction of the rotational direction of the rotary shaft 101.

Similar to the first embodiment, circumferential cooling grooves (not shown) are provided on the inner circumferential surface of the bearing metal of the upper bearing liner, and the starting portions of the cooling grooves from which the grooves extend communicate with the lubricant introduction path 108a. The other ends (terminal portions) of the cooling grooves communicate with an oil pocket (not shown) provided in the upper bearing 102b. The oil pocket has an oil drain hole (not shown). The oil pocket communicates through the oil drain hole with a lubricant drain hole (not shown) provided in the upper bearing liner and the base metal 104b. For the purpose of preventing lubricant leakage, a lubricant drain groove (not shown) is provided close to the edge of the shaft-sliding surface on the open end side of a bearing housing (not shown) having the bearing therein. The lubricant drain groove is adapted to discharge extra lubricant to the lower side of the bearing.

Next, the structure of the cooling grooves 106 is described below. As shown in FIGS. 8 and 9, the cooling grooves 106 have turbulence inducing structures 114 at one or more locations. The turbulence inducing structures 114 are designed to disturb the flow of the lubricant flowing through the cooling grooves 106.

Figure 11:
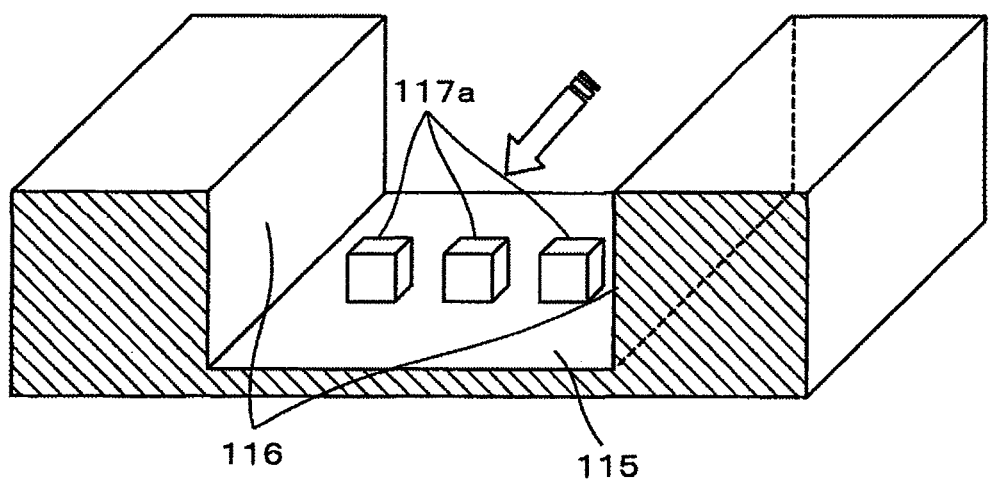
FIG. 11 is a diagram showing an example of a turbulence inducing body designed to disturb the flow of the lubricant.

FIG. 11 shows an example of the turbulence inducing structures 114. The turbulence inducing structure 114 shown in FIG. 11 has a shaft-sliding surface side inner wall 115 and side walls 116, which constitute one of the cooling grooves 106. As shown in FIG. 11, a plurality of projecting turbulence-inducing bodies 117a are provided on the shaft-sliding surface side inner wall 115 and arranged parallel to the longitudinal direction of the rotary shaft 101.

Figure 12:
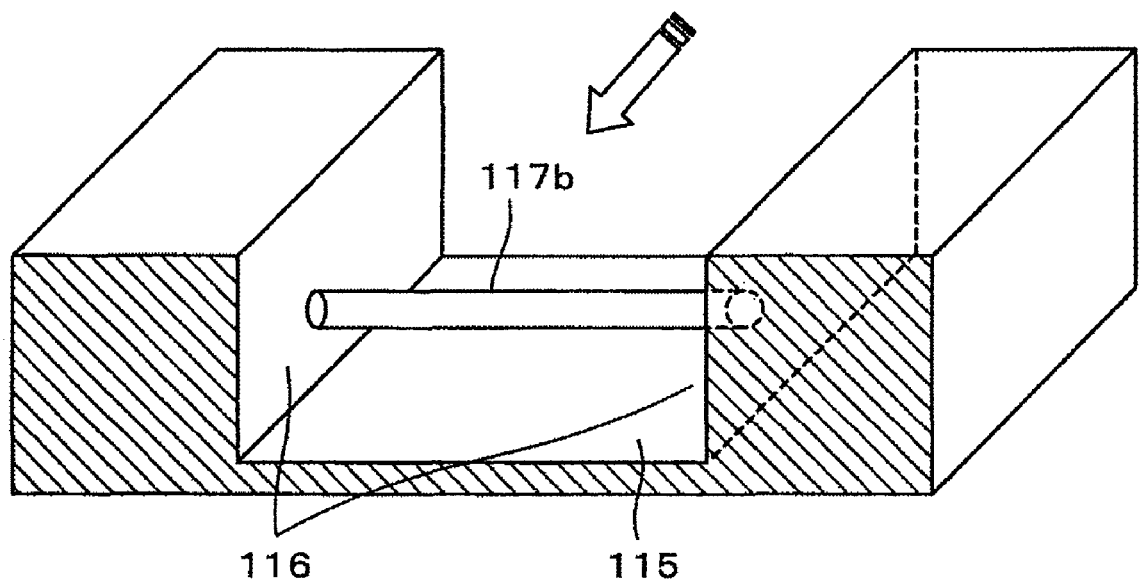
FIG. 12 is a diagram showing another example of the turbulence inducing body designed to disturb the flow of the lubricant.

FIG. 12 shows another example of the turbulence inducing structures. The structure of FIG. 12 has a cylindrical turbulence inducing body 117b provided between the side walls 116 of the cooling groove 106 so as to connect them.

Next, the positions in the cooling grooves 106 at which to place the turbulence inducing structures 114 are explained below.

Figure 18:
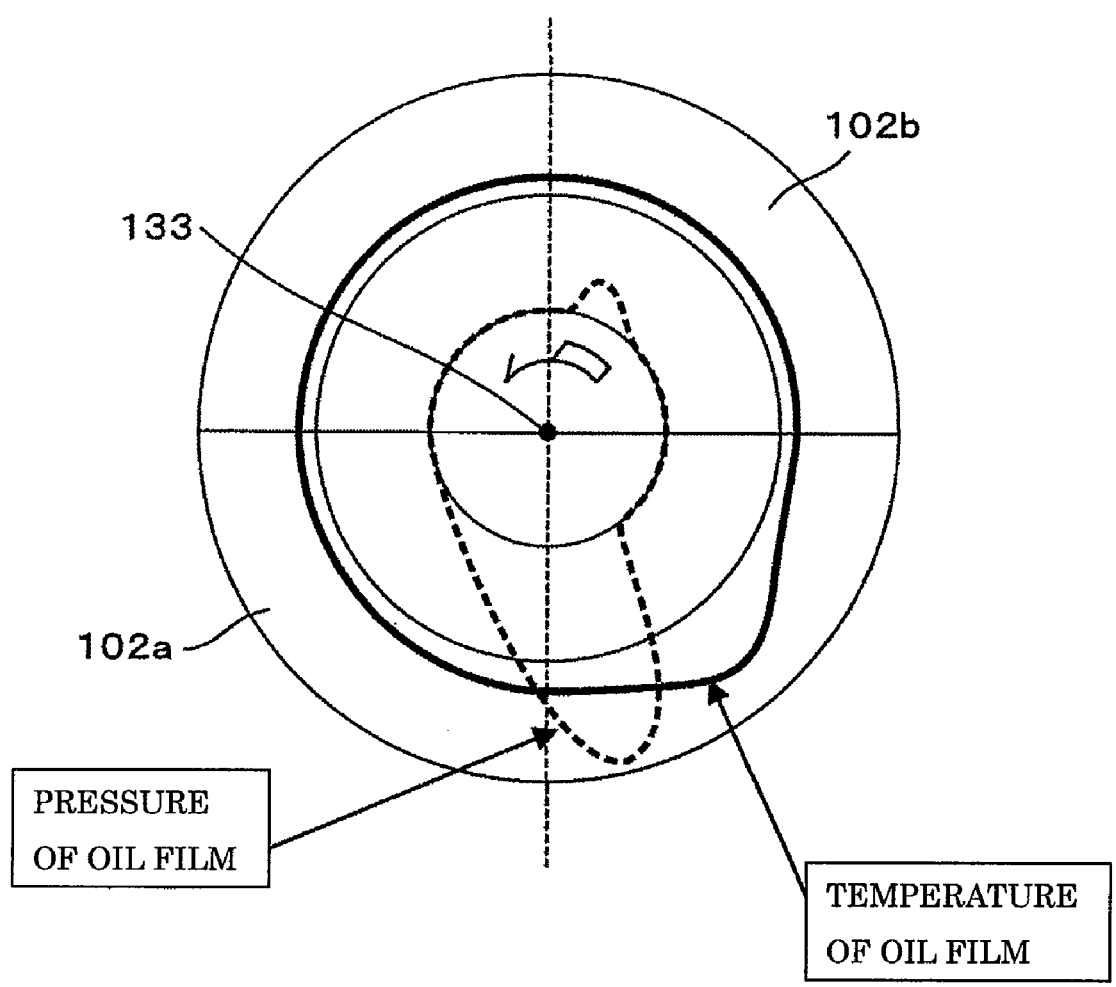
FIG. 18 is a diagram showing a distribution of the temperature of an oil film and the positional relationship between the oil film and the bearing.

FIG. 18 shows the temperature distribution of the lubricant film present on the shaft-sliding surface. Similar to the first embodiment, when the rotary shaft 101 rotates, the lubricant film temperature becomes highest at the position located 30 to 40 degrees away from the broken line connecting the rotational axis 133 of the rotary shaft 101 and the lowest point of the lower bearing 102a in the rotational direction of the rotary shaft 101 (the rotational direction being the counterclockwise direction of FIG. 18 and indicated by the uncolored arrow). The bearing temperature is also highest at that position and thereabout.

In the present embodiment, the lubricant flows through the cooling grooves 106 in the reverse direction of the rotational direction of the rotary shaft 101. The lubricant passes through the highest temperature portion of the bearing when it flows from the lubricant introduction path 108a through the cooling grooves 106 to the lubricant introduction path 108b. The turbulence inducing structures 114 are thus provided upstream of the bearing highest temperature portion in the flow direction of the lubricant inside the cooling grooves 106; alternatively, they are provided at the position located 30 degrees or more away from the broken line connecting the rotational axis 133 and the lowest point of the lower bearing 102a in the rotational direction of the rotary shaft 101.

The flow of the lubricant from the lubricant introduction path 108a into the cooling grooves 106 is thus disturbed by the turbulence inducing structures 114 before it reaches the bearing highest temperature portion to cool that portion. Thereafter, the lubricant flows through the lubricant introduction path 108b onto the shaft-sliding surface. Since the lubricant flow is disturbed upstream of the bearing highest temperature portion, this improves the efficiency of the heat transfer performed by means of the lubricant. A higher cooling effect can be obtained than in the bearing of the first embodiment.

The turbulence inducing structures 114 may be installed also at the bearing highest temperature portions inside the cooling grooves. This produces a still higher cooling effect because the turbulence inducing body increases the surface area of the turbulence inducing structure 114.

Next, a detail method for installing the turbulence inducing body is described below with reference to FIGS. 10, 13A, and 13B.

FIG. 10 is a perspective view of the lower bearing 102a. As shown in FIG. 10, the bearing 102a is divided into the bearing liner 103a and the bearing base metal 104a. At least one of the circumferential cooling grooves 106 is provided on the outer circumferential surface of the bearing liner 103a. Each cooling groove 106 has a slit-shaped installation groove 118. The turbulence inducing body is included in a structure as shown in FIGS. 13A and 13B. The structure having the turbulence inducing body is inserted in and engaged with the mounting structure 118, and whereby the turbulence inducing body is installed in the cooling groove (also called an oil passing hole) 106 to form the turbulence inducing structure 114.

Figure 13A:
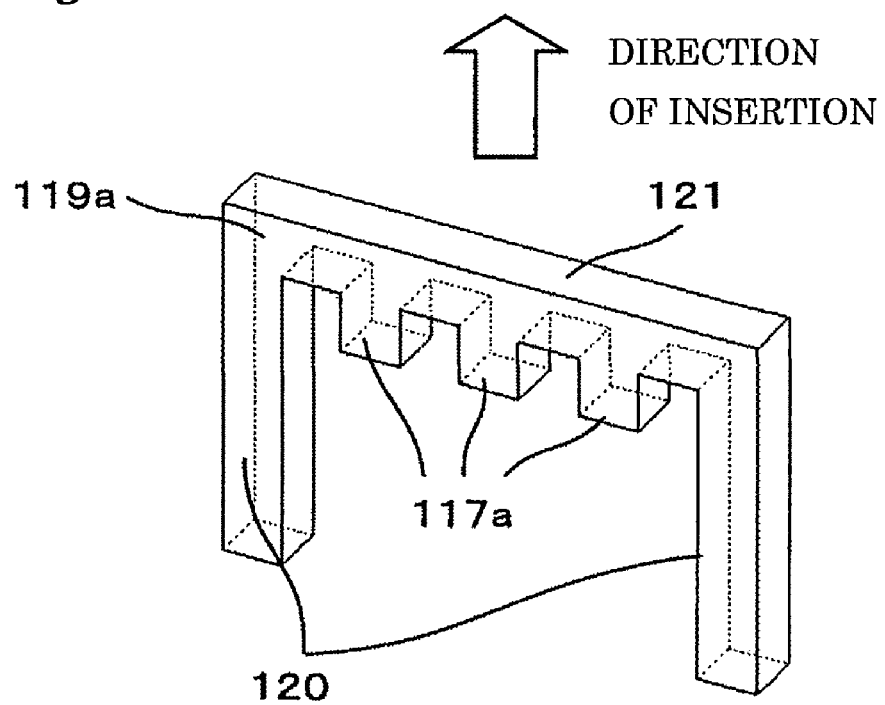
FIGS. 13A and 13B are diagrams each showing a structure designed to disturb the flow of the lubricant present in an oil passing hole according to the present invention.
Figure 13B:
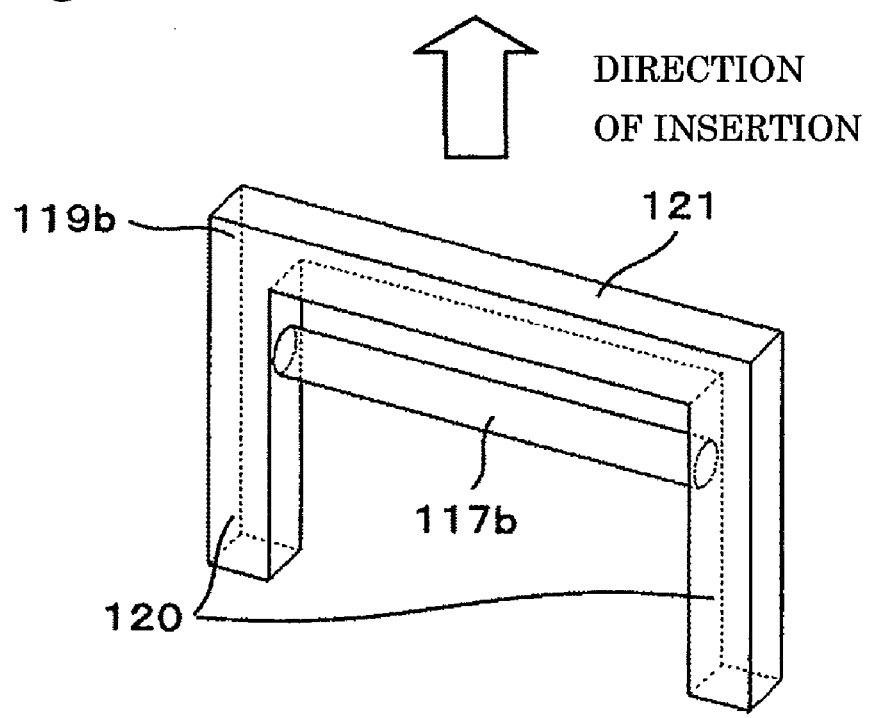

FIGS. 13A and 13B shows detail examples of the structures 119a and 119b. Each of structures 119a and 119b shown in FIGS. 13A and 13B has side wall portions 120 and an inner wall portion 121. The side wall portions 120 of each of the structures 119a and 119b are inserted in installation groove 118 formed into the side walls 116. The inner wall portion 121 of each of the structures 119a and 119b is inserted in installation groove 118 formed into the shaft-sliding surface side inner wall 115. The structure 119a has a turbulence inducing body 117a on the inner wall portion 121 present on the side of the cooling groove 106. The turbulence inducing body 117a is composed of a plurality of protrusions. The shape of each of the protrusions is not limited to the shape shown in FIG. 13A and may be cylindrical. In the example shown in FIG. 13B, the structure 119b has a turbulence inducing body 117b. The turbulence inducing body 117b is provided between the side wall portions 120 and connects the side wall portions 120. The turbulence inducing body 117b has a cylindrical shape.

The structure is made of a material having a higher heat transfer property than that of the bearing liner 103. The material of the structure is aluminum, copper, chromium copper (that is a copper alloy), or the like. This improves the efficiency of the heat transfer between the lubricant (serving as a cooling medium) and the bearing liner and contributes to an improvement of cooling performance.

Next, an effect of the present embodiment is described below.

An arrow shown in FIG. 8 indicates the direction of the flow of the lubricant. The lubricant supplied from the outside of the bearing by the oil supply pump passes through the oil supply hole and the oil supply path 107. Then, the lubricant passes through the lubricant introduction path 108a and is supplied to the shaft-sliding surface 127a. The other part of the lubricant passes through the oil supply path 107 and flows into the cooling groove 106 to ensure that the flow of the other part of the lubricant is disturbed by the turbulence inducing structure 114.

It is general that a lubricant has high viscosity and a low heat transfer property. Therefore, the flow of the lubricant in the cooling groove 106 easily becomes laminar. In order to improve the cooling effect, it is effective to disturb the flow of the lubricant. Since the lubricant passes through the turbulence inducing structure 114, the turbulence inducing body disturbs the flow of the lubricant to improve the efficiency of the heat transfer. The lubricant that passes through the cooling groove 106 is used to cool the area in which the temperature of the bearing has the highest increases in temperature. Therefore, viscosity of the lubricant is reduced. In addition, the lubricant is introduced onto the shaft-sliding surface from the lubricant introduction path 108b. This can reduce damage caused by friction.

Next, an effect of the turbulence inducing body is described below. As shown in FIG. 11, a turbulence inducing body 117a is provided on the shaft-sliding surface side inner wall 115 of the cooling groove 106 and projects from the shaft-sliding surface side inner wall 115. The turbulence inducing body 117a disturbs the flow of the lubricant flowing near the surface (located on the side of the shaft-sliding surface) of the cooling groove 106 to improve the efficiency of the heat transfer. As shown in FIG. 12, a turbulence inducing body 117b is provided between the side walls of the cooling groove 106 and near the surface (located on the side of the shaft-sliding surface) of the cooling groove 106. The turbulence inducing body 117b has a cylindrical shape. The turbulence inducing body 117b causes a swirl in the flow of the lubricant to improve the efficiency of the heat transfer.

The position of the area in which the temperature of the oil film is the highest is near a location at which the maximum load is applied from the rotary shaft. According to the present invention, this load causes the bearing surface located above the cooling groove 106 to be transformed, and thereby causes the lubricant to be dammed on the bearing surface. This improves lubrication performance.

Figure 14:
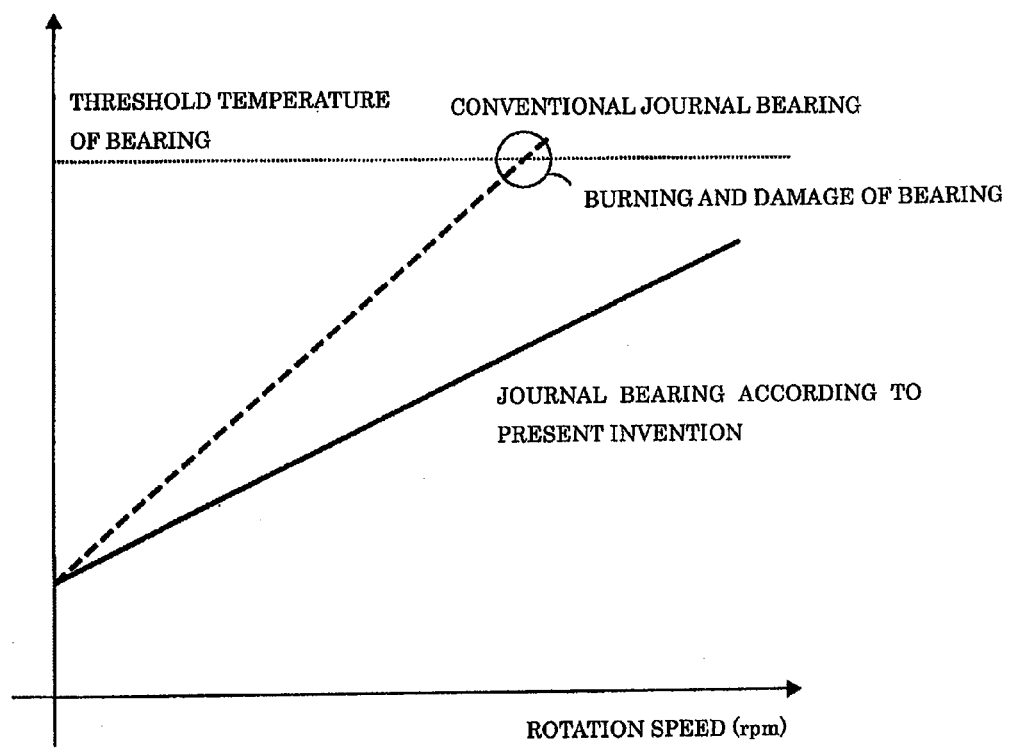
FIG. 14 is a graph showing the relationship between the highest temperature of a bearing shaft-sliding surface and a rotation speed of a rotary machine and shows an advantage obtained when the bearing according to the present invention is used under the condition that the rotation speed of the rotary machine is high.

FIG. 14 is a graph showing temperature characteristics of the journal bearing according to the present embodiment. A broken line shown in FIG. 14 indicates the relationship between the highest temperature of a shaft-sliding surface of a conventional bearing and a rotation speed of the conventional bearing. As the rotation speed increases, the temperature of the bearing shaft-sliding surface increases. A solid line shown in FIG. 14 indicates the temperature characteristics of the journal bearing according to the present embodiment. Since the journal bearing according to the present embodiment includes the lower bearing liner 103a having the cooling groove 106, the lubricant flows in the area in which the temperature of the oil film is the highest of all portions of the oil film. Therefore, the increase rate of the temperature of the shaft-sliding surface of the journal bearing according to the present embodiment is lower than that of the temperature of the shaft-sliding surface of the conventional bearing. The journal bearing according to the present embodiment can be used at a rotation speed at which the conventional bearing burns out and cannot be used. This makes it possible to increase an operation speed of a rotary machine such as a steam turbine, a gas turbine and a centrifugal compressor and increase a load applied to such a rotary machine.

Fifth Embodiment

Figure 15:
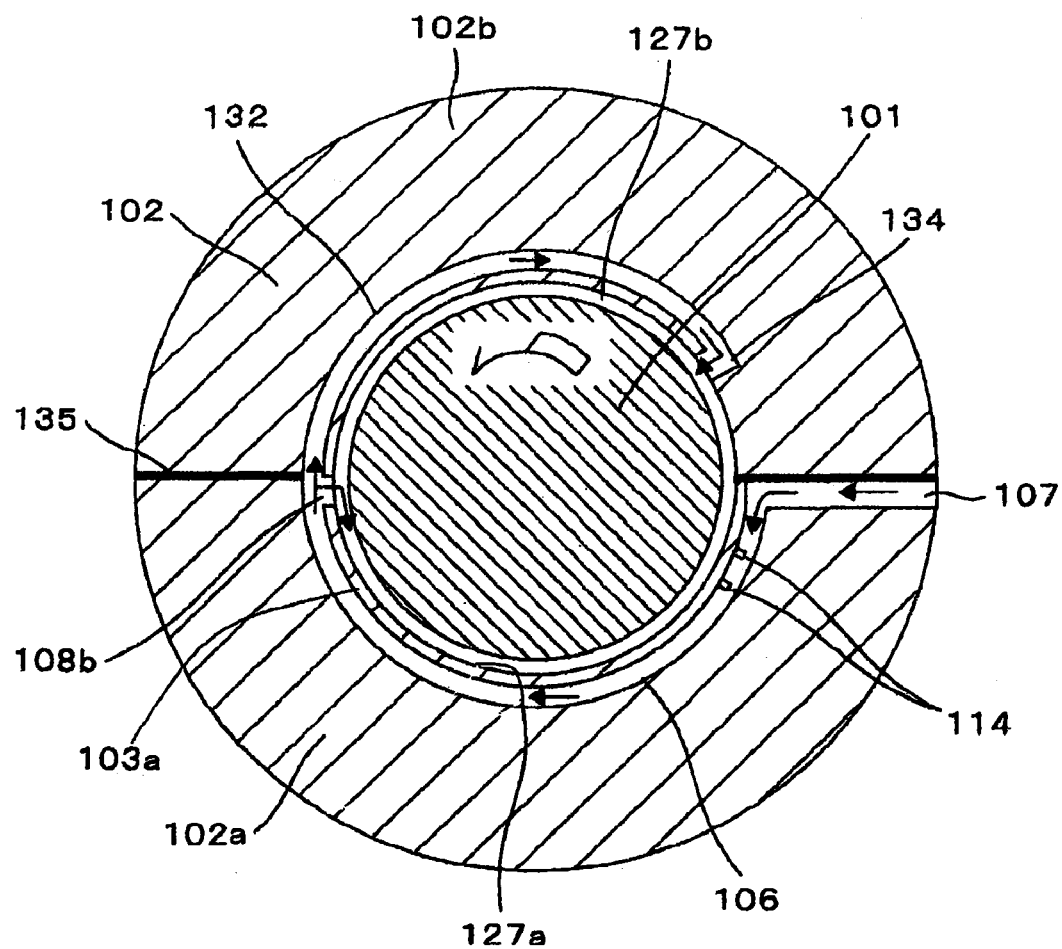
FIG. 15 is a vertical cross-sectional view of a bearing according to a fifth embodiment of the present invention.

FIG. 15 is a vertical cross-sectional view of a bearing according to a fifth embodiment of the present invention.

The same parts as those of the bearing according to the fourth embodiment are not described in the fifth embodiment. Parts different from those of the bearing according to the fourth embodiment are described below.

In the fifth embodiment, an inner circumferential side portion of the oil supply path 107 provided in the bearing base metal 104a only communicates with the cooling groove 106.

The upper bearing liner has a cooling groove 132 formed in an outer circumferential surface thereof. The cooling groove 132 extends along a circumferential direction of the upper bearing liner. The cooling groove 132 is designed to communicate with the lubricant introduction path 108b of the lower bearing liner 103a when the upper bearing 102a and the lower bearing 102a are integrated with each other by means of a fastening member. A lubricant introduction hole 134 is provided near the contact surface 130a of the lower bearing liner 103a and the contact surface (not shown) of the upper bearing liner. The contact surface 130a and the upper contact surface face each other. The lubricant introduction hole 134 communicates with a shaft-sliding surface 127b of the upper bearing 102b and the cooling groove 132. The shaft-sliding surface 127b is located on the inner circumferential side of the bearing liner.

The lubricant supplied from the outside of the bearing 102 by the oil supply pump passes through the oil supply hole and the oil supply path 107. Then, all parts of the lubricant flow into the cooling groove 106. The lubricant that flows into the cooling groove 106 cools the lower bearing 102a. After that, a part of the lubricant flows onto the shaft-sliding surface 127a through the lubricant introduction path 108b. The remaining part of the lubricant flows into the cooling groove 132 that communicates with the lubricant introduction path 108b. Then, the remaining part of the lubricant flows to the shaft-sliding surface 127b of the upper bearing 102b through the lubricant introduction hole 134 that communicates with the cooling groove 132.

The cooling groove 106 has the turbulence inducing structure 114 in the same manner as that in the fourth embodiment. The turbulence inducing structure 114 is provided on the upstream side of the flow of the lubricant present in the cooling groove 106 with respect to the area in which the temperature of the bearing is the highest of all portions of the bearing.

In addition, the turbulence inducing structure 114 is located on the side of the lower bearing 102a and on the vertical axis (connecting the rotational axis 133 of the rotor with the bottom point of the bearing 102a) rotated by 30 degrees or more in the rotational direction of the rotor.

Next, an effect of the present embodiment is described below with reference to FIG. 15.

An arrow shown in FIG. 15 indicates the direction of the flow of the lubricant. The lubricant is supplied from the outside of the bearing and passes through the oil supply hole. Then, the lubricant is supplied to the oil supply path 107. All parts of the lubricant pass through the cooling groove 106 to cool the lower bearing 102a. The cooling groove 106 has one or more of the turbulence inducing structures 114 at one or more locations in the same manner as that in the fourth embodiment. The turbulence inducing body disturbs the flow of the lubricant to improve the efficiency of the heat transfer performed by means of the lubricant.

In the present embodiment, since the bearing is configured to ensure that all the parts of the lubricant supplied from the oil supply path 107 are supplied to the cooling groove 106, the flow rate of the lubricant is higher than that in the fourth embodiment. When the lubricant passes through the turbulence inducing structure 114 adapted to disturb the flow of the lubricant, it can be expected to improve the efficiency of the heat transfer. The increase rate of the temperature of the shaft-sliding surface of the journal bearing according to the present embodiment is lower than that of the temperature of the shaft-sliding surface of the conventional bearing. The journal bearing according to the present embodiment can be used at a rotation speed at which the conventional bearing burns out and cannot be used. This makes it possible to increase an operation speed of a rotary machine such as a steam turbine, a gas turbine and a centrifugal compressor and increase a load applied to such a rotary machine.

Sixth Embodiment

Figure 16A:
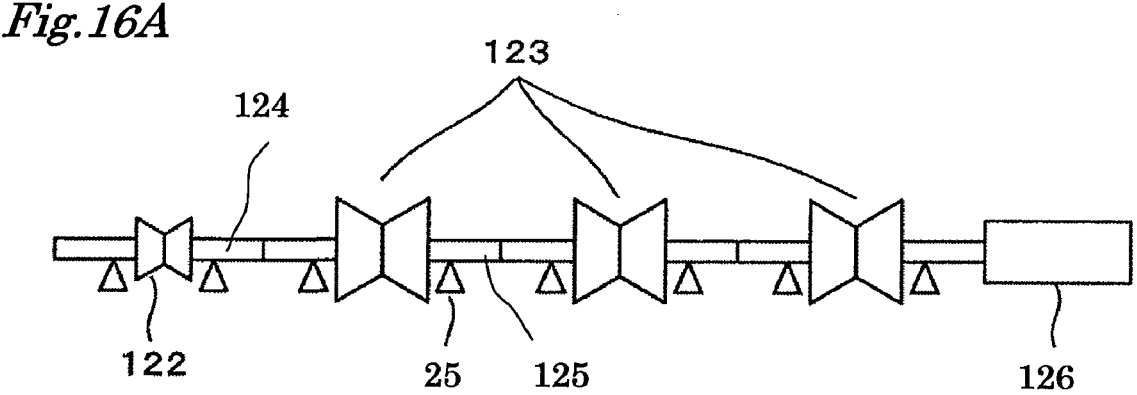
FIGS. 16A and 16B are diagrams each showing a rotary machine using the bearing according to the present invention.
Figure 16B:
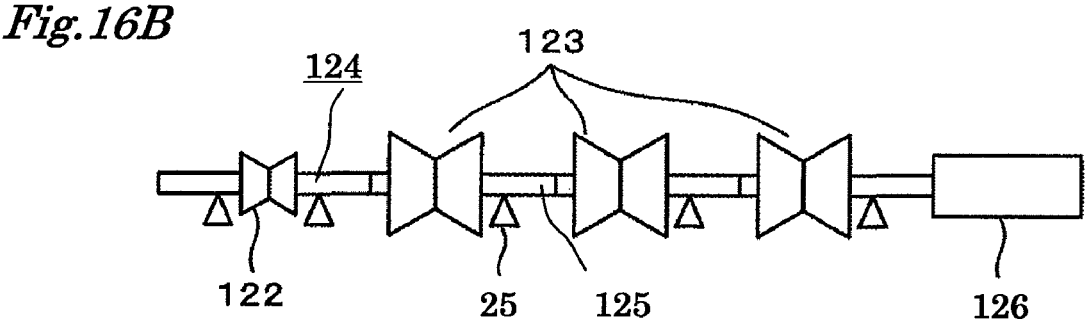
Figure 17:
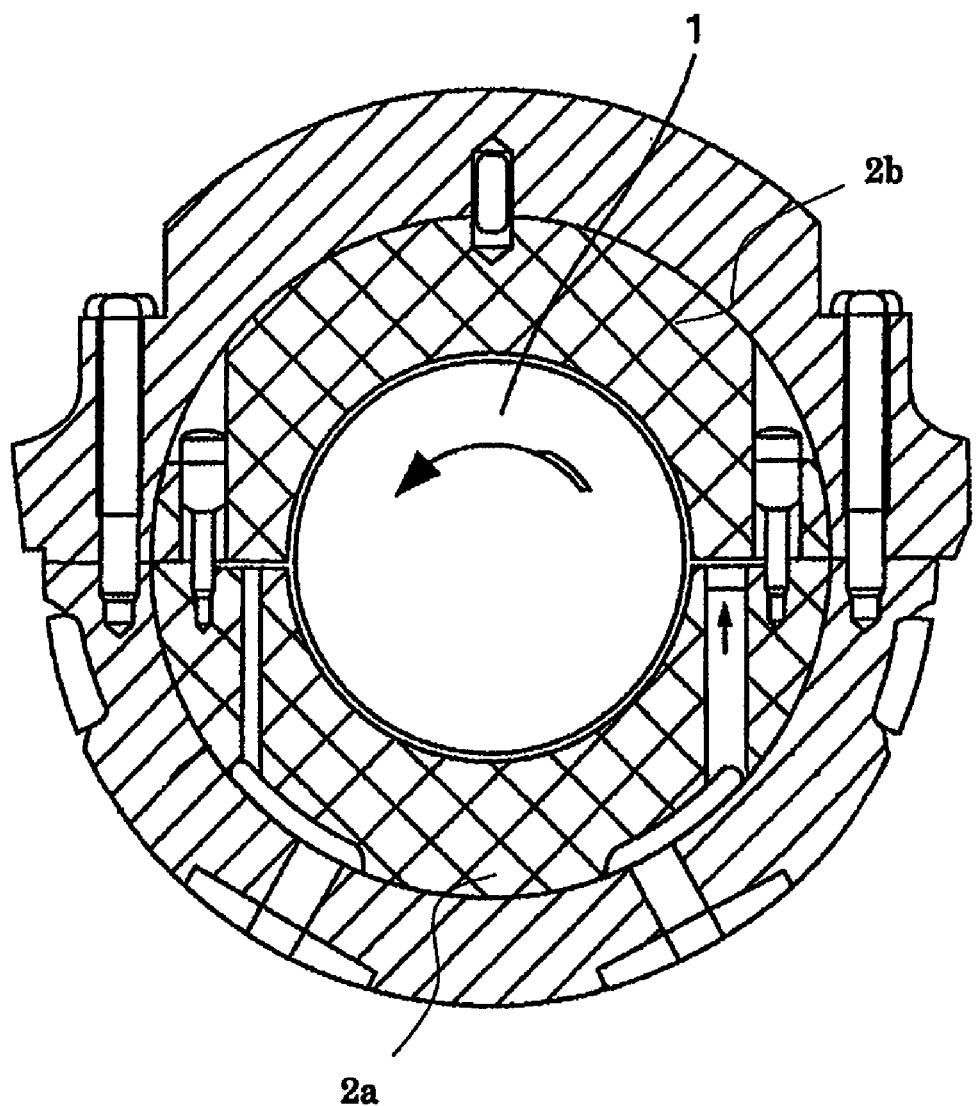
FIG. 17 is a vertical cross-sectional view of a conventional bearing structure.

FIGS. 16A and 16B show examples in which the journal bearing according to the present invention is applied to a steam turbine used as an example of a rotary machine.

A single shaft steam turbine including a high pressure turbine 122 and lower pressure turbines 123 typically has a high pressure turbine rotor 124 and a lower pressure turbine rotor 125. These rotors and a generator 126 are coupled to each other by means of a single shaft. In order to improve an efficiency of heat transfer in the steam turbine, a blade of each rotor is made longer. This results in an increase in the diameter of a shaft. Thus, the weight of the steam turbine increases. Such a steam turbine as that shown in FIG. 16A has two bearings 25 holding the rotors.

However, the journal bearing according to the present invention can bear a high load compared with conventional techniques. The single journal bearing according to the present invention can be provided between the rotors as shown in FIG. 16B. This reduces the total length of the turbine and the size of a building for construction of the turbine. In addition, since it is possible to reduce the number of the bearings, the turbine can be easily maintained compared with the conventional techniques.

What is claimed is:

1. A journal bearing device, the journal bearing device being divided vertically into an upper bearing and a lower bearing and comprising:
   a rotor of a rotary machine;
   a bearing having a bearing liner and a bearing base metal, the rotor being held by the bearing device, where the bearing base metal has an upper bearing base metal and a lower bearing base metal, and
   the bearing liner is made of a material different from that of the bearing base metal and the bearing liner has an upper bearing liner and a lower bearing liner;
   a cooling groove disposed in an outer circumferential surface of the lower bearing liner and extending along a circumferential direction of the lower bearing liner;
   means for supplying a lubricant to the cooling groove to ensure that the lubricant flows in the cooling groove in an opposite direction to a rotational direction of the rotor, wherein the lubricant that passes through the cooling groove is supplied to a bearing load-receiving surface of the lower bearing; and
   means, disposed at a shaft-sliding surface of the inner circumferential side of the bearing liner above a supply position of the lubricant supplying means, for discharging the lubricant to the outside of the bearing.

2. The journal bearing device according to claim 1, wherein the means for supplying the lubricant to the cooling groove includes:
   an oil supply pocket that is disposed in the lower bearing base metal and communicates with the cooling groove; and
   an oil pocket that is disposed in the lower bearing base metal and communicates with the oil supply pocket;
   a lubricant pocket that is disposed in the lower bearing base metal and communicates with the oil pocket and an outer circumferential portion of the bearing base metal, and to which the lubricant is supplied from the side of the bearing base metal,
   the lubricant pocket is disposed such that the lubricant supplied to the cooling groove through the oil pocket and the oil supply pocket flows in the opposite direction to the rotational direction of the rotor.

3. The journal bearing device according to claim 1, further comprising:
   means for supplying a lubricant to the cooling groove and the upper bearing.

4. The journal bearing device according to claim 3, wherein,
   the means for supplying the lubricant to the cooling groove and the upper bearing has an oil supply pocket and a second cooling groove,
   the oil supply pocket is disposed in the lower bearing base metal and communicates with the cooling groove, and
   the second cooling groove is disposed on an inner circumferential side of the upper bearing liner, extends along an inner circumferential direction of the upper bearing liner and communicates with the oil supply pocket.

5. The journal bearing device according to claim 3, wherein,
   an oil groove for cooling a rotary shaft is disposed in the shaft-sliding surface of the upper bearing, and
   means for preventing the lubricant that flows in the oil groove to cool the rotary shaft from flowing onto the bearing load-receiving surface of the lower bearing.

6. The journal bearing device according to claim 5, wherein,
   the means for preventing the lubricant that flows in the oil groove to cool the rotary shaft from flowing onto the bearing load-receiving surface of the lower bearing is disposed in the upper bearing liner and includes:
   an oil pocket that communicates with the oil groove:
   an oil drain hole disposed in the oil pocket;
   a lubricant drain hole that is disposed in the upper bearing liner and the upper bearing base metal and communicates with the oil drain hole.

7. The journal bearing device according to claim 1, wherein the lower bearing liner has a shaft-sliding surface such that the shaft-sliding surface covers an area in which pressure is exerted on the lubricant.

8. The journal bearing device according to claim 1, wherein each of the upper and lower bearing liners has a shaft-sliding surface such that the shaft-sliding surface covers an area in which pressure is exerted on the lubricant.

9. The journal bearing device according to claim 1, wherein the cooling groove has a turbulence inducing body designed to disturb the flow of the lubricant present in the cooling groove, and
   the turbulence inducing body is disposed on the upstream side of a flow path of the lubricant with respect to an area in which the temperature of the bearing is the highest of all portions of the bearing.

10. The journal bearing device according to claim 9, wherein
   the turbulence inducing body is made of a material having a higher heat transfer property than that of the bearing liner.

11. The journal bearing device according to claim 1, wherein
the cooling groove has a turbulence inducing body designed to disturb flow of the lubricant present in the cooling groove, and
when an imaginary line connecting a rotational axis of the rotor with a bottom point of the lower bearing liner and parallel to the vertical direction is defined as a vertical axis, the turbulence inducing body is located on the side of the lower bearing liner and on the vertical axis rotated by 30 degrees or more in the rotational direction of the rotor.

* * * * *